US007050283B2

(12) United States Patent
Field et al.

(10) Patent No.: US 7,050,283 B2
(45) Date of Patent: May 23, 2006

(54) METHOD AND APPARATUS FOR PROTECTING MONITOR CIRCUIT FROM FAULT CONDITION

(75) Inventors: D. George Field, Pleasant Grove, UT (US); Kevin D. Banta, Highland, UT (US); E. Carl Goodman, Bountiful, UT (US)

(73) Assignee: Won-Door Corporation, Salt Lake City, UT (US)

( * ) Notice: Subject to any disclaimer, the term of this patent is extended or adjusted under 35 U.S.C. 154(b) by 151 days.

(21) Appl. No.: 10/134,338

(22) Filed: Apr. 29, 2002

(65) Prior Publication Data

US 2003/0202310 A1   Oct. 30, 2003

(51) Int. Cl.
*H02H 5/04* (2006.01)
(52) U.S. Cl. .................... 361/106; 361/103
(58) Field of Classification Search ............... 361/106, 361/104, 103
See application file for complete search history.

(56) References Cited

U.S. PATENT DOCUMENTS

| | | | | |
|---|---|---|---|---|
| 4,546,305 | A | * | 10/1985 | Goddijn et al. ............. 323/299 |
| H248 | H | * | 4/1987 | Middlebrooks ............. 340/639 |
| 4,700,130 | A | | 10/1987 | Bloemen |
| 4,967,176 | A | | 10/1990 | Horsma et al. |
| 5,072,327 | A | * | 12/1991 | Knollman et al. .......... 361/106 |
| 5,245,879 | A | | 9/1993 | McKeon |
| 5,612,847 | A | | 3/1997 | Malecke et al. |
| 5,629,658 | A | | 5/1997 | Chen |
| 5,745,322 | A | | 4/1998 | Duffy et al. |
| 5,864,280 | A | | 1/1999 | Hall |
| 5,976,720 | A | | 11/1999 | St. Jean et al. |
| 6,307,758 | B1 | * | 10/2001 | Geren ....................... 363/21.15 |
| 6,331,763 | B1 | * | 12/2001 | Thomas et al. .............. 320/136 |
| 6,518,731 | B1 | * | 2/2003 | Thomas et al. .............. 320/136 |

FOREIGN PATENT DOCUMENTS

| | | | |
|---|---|---|---|
| DE | 229 261 A1 | | 10/1985 |
| DE | 298 08 365 U1 | | 9/1998 |
| JP | 10-023660 | * | 1/1998 |
| WO | WO 99/40663 | * | 8/1999 |

OTHER PUBLICATIONS

Secutron Fire Alarm Systems: "Modul R" MR-2605, 5 Zone Conventional Fire Alarm Control Unit, Release 1.1, Canada XP002248087, www.secutron.ca, Oct. 18, 2000.
PCT International Search Report dated Jul. 17, 2003.

* cited by examiner

*Primary Examiner*—Brian Sircus
*Assistant Examiner*—Zeev Kitov
(74) *Attorney, Agent, or Firm*—TraskBritt

(57) ABSTRACT

A method and apparatus for improving the fault protection of a monitor circuit is provided by coupling an input protection circuit to an output section. The input protection circuit may include a fusible device that limits or removes a fault condition present at an input to the input protection circuit. The fusible device may be, for example, a resettable positive temperature coefficient ("PTC") device configured to limit the current passing through it to a predetermined level once it reaches a predetermined temperature. A resistive element may be thermally coupled to the PTC device to assist in reaching the predetermined temperature. The monitor circuit may further be configured to generate a sensory signal in response to a fault condition.

40 Claims, 4 Drawing Sheets

METHOD AND APPARATUS FOR PROTECTING MONITOR CIRCUIT FROM FAULT CONDITION

BACKGROUND OF THE INVENTION

1. Field of the Invention

The present invention relates generally to monitor circuits. More specifically, the present invention relates to a device and method for the fault protection of monitor circuits.

2. State of the Art

Monitor circuits are utilized to provide an indication that a predetermined event has occurred. For example, monitor circuits may be included in an alarm system for providing a signal to a controller within the alarm system when an event trigger is detected.

For purposes of discussion, FIG. 1 shows an exemplary monitor circuit 10 configured to detect an external connection between input nodes 12 and 14 at the closing of a switch. As will be appreciated by one of ordinary skill in the art, such an event is known in the art as a "dry contact" or "dry connection" because no external power source is applied to either input node 12 or 14. In other words, in the example shown, signals ALARM+ and ALARM COM are coupled externally. Monitor circuit 10, as shown, further comprises diodes 16, 18, resistive element 20 and an exemplary isolated output section 34. Isolated output section 34 includes resistive element 22 and optically coupled isolator 24. Isolator 24 comprises light-emitting diode ("LED") 26 and phototransistor 28. For purposes of this example, resistive element 20 may be approximately 620 Ohms and resistive element 22 may be approximately 20,000 Ohms. As shown in FIG. 1, input node 14 is coupled to ground. Input node 12 is coupled to both the anode of diode 16 and the cathode of LED 26. The cathode of diode 16 is coupled to the anode of LED 26 and to a 12 Vdc signal through a series connection of diode 18 and resistive element 20. The emitter of phototransistor 28 is coupled to ground and its collector is coupled to a 5 Vdc signal through resistive element 22. The collector of phototransistor 28 is coupled to resistive element 22 at output node 30 which produces an output signal (e.g., "Alarm_in").

Isolator 24 and diodes 16, 18 provide protection to monitor circuit 10 as well as external circuitry (not shown.) Optically coupled isolator 24 provides electrical isolation between external event circuitry (not shown) coupled to input nodes 12, 14 and an external monitoring system (not shown) coupled to output node 30. Diode 16 protects LED 26 from any negative voltage spike that may occur at input node 12. Diode 18 prevents current from being drawn from external circuitry coupled to input node 12 in the event that the power source providing the 12 Vdc signal fails.

When input nodes 12 and 14 have been externally short-circuited, an electrical path is created between the 12 Vdc signal and ground through diode 18, resistive element 20 and LED 26. Thus, approximately 16 mA of current flows through LED 26, turning on phototransistor 28 and clamping resistive element 22 to ground. The ground at output node 30 indicates that the short-circuit event has occurred. Conversely, when input nodes 12 and 14 have not been short-circuited, current cannot flow through LED 26, phototransistor 28 is not turned on and output node 30 remains at 5 Vdc.

Monitor circuit 10 may be used, for example, in a fire alarm system that closes a dry contact switch and creates a connection between input nodes 12 and 14 when a fire is indicated by an appropriate signal. However, not all fire alarm systems, or circuitry associated therewith, are configured exactly the same. For example, some fire alarm systems may provide a 12 Vdc, 24 Vdc, 28 Vac or 120 Vac signal rather than a dry contact when a fire is sensed. Due to the diverse ways alarm systems may be configured, they can often be installed incorrectly, resulting in a fault condition arising within the monitor circuit 10.

As used herein, a "fault condition" may include an overvoltage condition or overcurrent condition which may cause harm to circuit elements. Further, a fault condition may include, for example, a signal which is provided as an alternating-current or "AC" when a direct-current "DC" signal is desired or expected. As will be recognized by those of ordinary skill in the art, an AC signal has periodic oscillations in which there will be a positive half cycle and a negative half cycle in each period.

Thus, for example, and referring back to FIG. 1, a fault condition may be present in the form of an overvoltage signal at input nodes 12, 14. Such an overvoltage signal can cause damage to monitor circuit 10 and result in incorrect operation of the alarm system. For example, if a 120 Vac signal is applied to input node 12, diode 18 will conduct on the negative half-cycle of the signal. The current flowing through diode 18, resistive element 20 and LED 26 will only be limited by the value of resistive element 20 (e.g., approximately 620 Ohms in the current example) and may destroy the circuit traces and LED 26, leaving the circuit inoperable. Such damage is costly and may cause additional harm to life and property if the faulty connection is not discovered before the presence of fire.

Thus, in view of the shortcomings in the art, it would be advantageous to develop a technique and device for protecting monitor circuits from fault conditions. It would also be advantageous to develop a technique and device to provide indication of the presence of a fault condition so the same could be appropriately remedied.

BRIEF SUMMARY OF THE INVENTION

The present invention relates to methods and apparatus for improving the fault protection in a monitor circuit.

A monitor circuit with improved fault protection according to the present invention includes an input protection circuit with a first input coupled to an output section at a control node. The input protection circuit includes a fault interrupt device configured to protect the monitor circuit by blocking the fault condition at the first input, limiting the current flowing between the first input and the control node and/or controlling the voltage at the control node. The monitor circuit may also be configured to generate a sensory signal in response to the fault condition being detected at the first input. In one embodiment, the fault interrupt device includes a fusible element to disrupt the current flowing between the first input and the control node. The fusible element may be a resettable positive temperature coefficient ("PTC") device configured to set the current flowing through it to a predefined level once it is tripped.

In another embodiment of the present invention, the fault interrupt device may include a first diode and resistive elements coupled in series with a PTC device to block a fault voltage at the first input and to further limit the current flowing between the first input and the control node. The fault interrupt may also include a second diode coupled between the control node and a second input of the input protection device to limit the voltage at the control node.

In another embodiment of the present invention, the fault interrupt device may include a resistive element thermally coupled to a PTC device to assist in tripping the PTC device and further limit the current flowing between the first input and the control node. The fault interrupt device may also include a breakdown diode coupled between the control node and a second input of the input protection device to control the voltage at the control node.

Other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

In the drawings, which illustrate what are currently considered to be best modes for carrying out the invention.

DETAILED DESCRIPTION OF THE INVENTION

Figure 1:
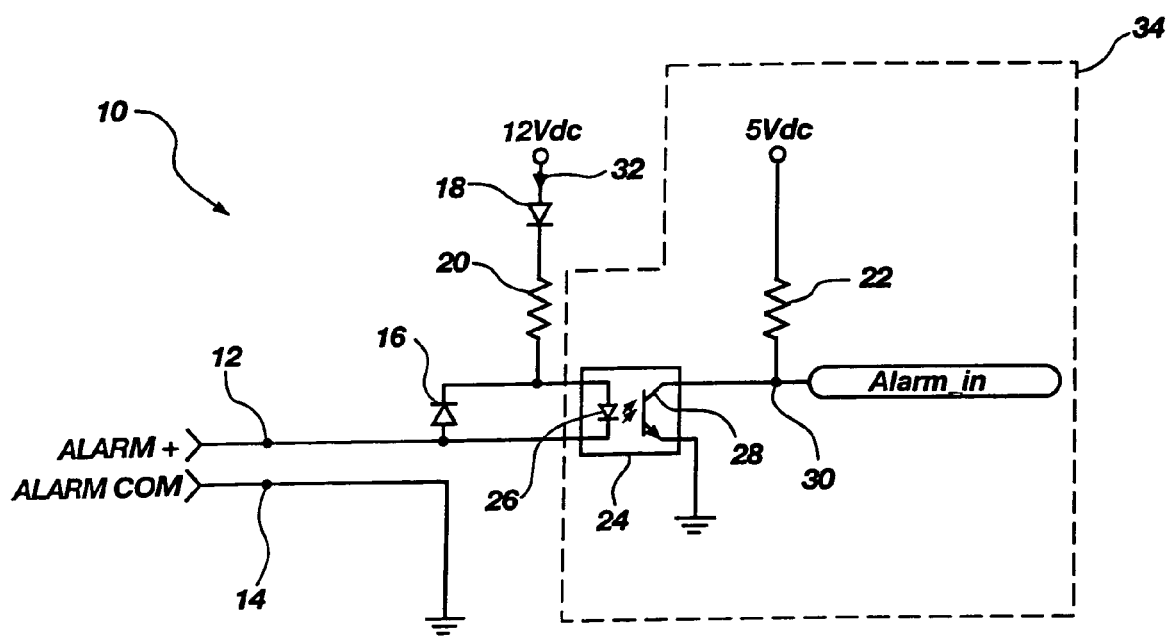
FIG. 1 is a schematic diagram of a monitor circuit including an exemplary isolated output section.
Figure 2:
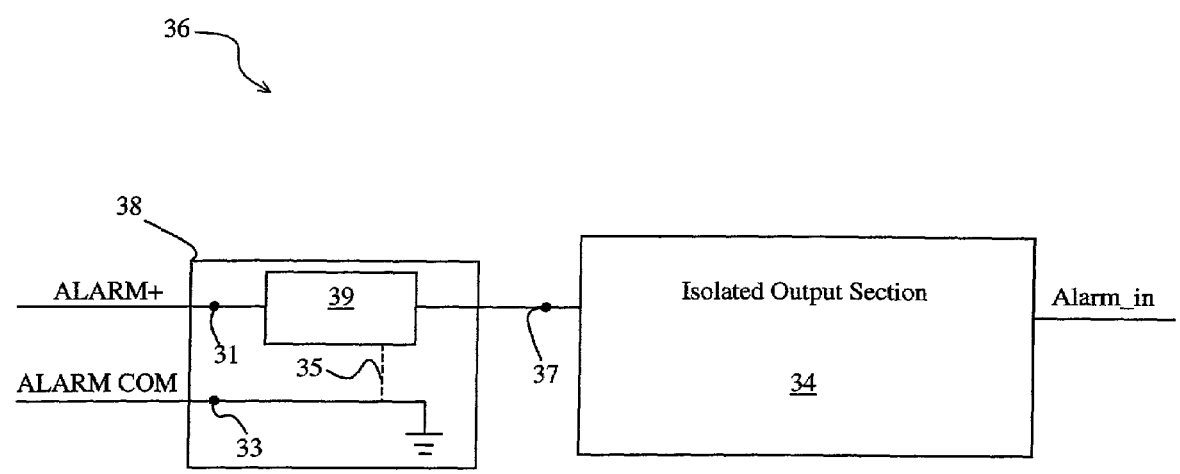
FIG. 2 is a block diagram according to the present invention of the isolated output section of FIG. 1 coupled to an input protection circuit configured to limit or remove a fault condition presented at its input.

FIG. 2 shows a block diagram of a monitor circuit 36 according to one embodiment of the present invention. The monitor circuit 36 comprises an exemplary isolated output section 34, such as the isolated output section 34 shown in FIG. 1, coupled to an input protection circuit 38 at a control node 37. Input protection circuit 38 is configured to provide isolated output section 34 with an electrical path to ground when input nodes 31, 33 (corresponding to signals ALARM+ and ALARM COM, respectively) have been short-circuited externally. Input protection circuit 38 includes a fault interrupt device 39 coupled between input node 31 and control node 37. Input node 33 is coupled to ground and may also be coupled to the fault interrupt device 39, as represented by dashed line 35.

Fault interrupt device 39 is configured to protect monitor circuit 36 from a fault condition presented at input node 31. This may be accomplished by blocking a fault voltage at input node 31, limiting the current flowing between input node 31 and control node 37 and/or controlling the voltage at control node 37. Monitor circuit 36 may also be configured to generate a sensory signal (also referred to as an output signal) in response to the fault condition being detected at input node 31. Further, this sensory signal may be output as a signal (e.g., via the "Alarm_in" output) to provide indication to external circuitry or monitoring equipment that a fault condition exists.

By way of example, fault interrupt device 39 may be a fuse configured to blow, thus creating an open circuit, when the current passing through it reaches a predetermined threshold level. Alternatively, fault interrupt device 39 may be a resettable fuse which is configured to allow current to flow through it once the default condition has been removed from input node 31. For example, fault interrupt device 39 may be a positive temperature coefficient ("PTC") element such as Raychem Corporation's Polyswitch® PTC device. As such, fault interrupt device 39 may be configured to sharply limit the current passing through it as its temperature increases over a relatively small temperature range. Such PTC devices are known in the art as circuit protection devices that limit current by increasing their resistance when tripped by an applied current over a predetermined threshold, and reset to re-create a closed-circuit condition when the current exceeding the threshold condition is removed. In addition, fault interrupt device 39 may be a fuse or PTC element in combination with other circuit elements to limit voltage and current to acceptable levels within monitor circuit 36. To generate the sensory signal, fault interrupt device 39 may be configured to trip and reset at a defined rate to create a detectable pulsed signal via the output Alarm_in.

Figure 3:
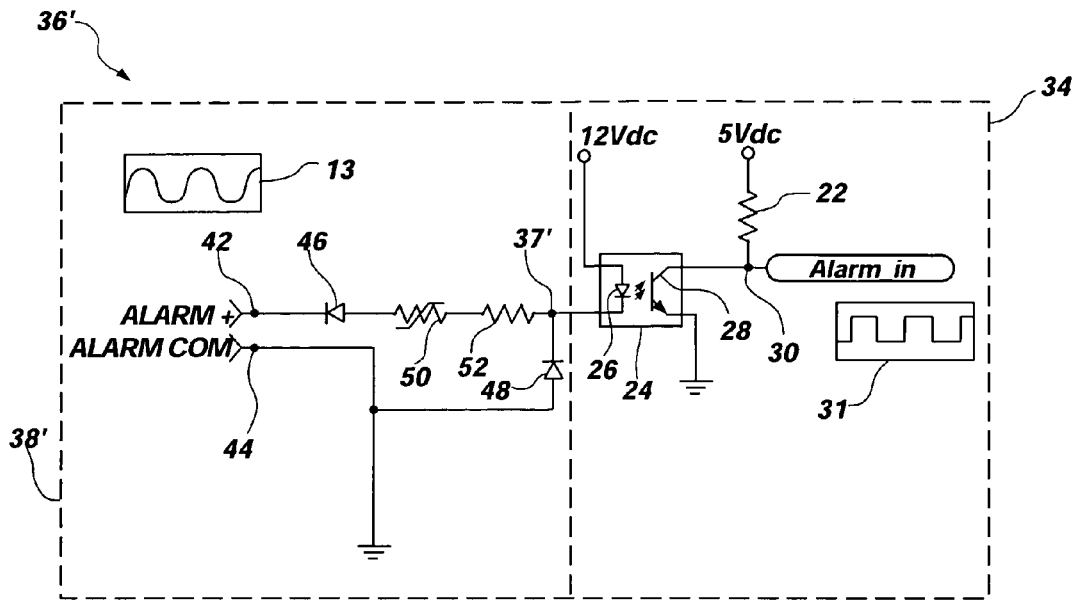
FIG. 3 is a schematic diagram according to the present invention of the isolated output section of FIG. 1 coupled to an input protection circuit comprising a positive temperature coefficient ("PTC") device coupled in series with a diode and resistive element to block or limit a fault condition, and a diode to limit a voltage at a control node.

FIG. 3 shows a schematic diagram of a monitor circuit 36' according to another embodiment of the present invention. Monitor circuit 36' comprises input protection circuit 38' coupled to the isolated output section 34 of FIG. 1. Input protection circuit 38' comprises input nodes 42, 44, diodes 46, 48, resistive element 52 and PTC device 50. For illustrative purposes, PTC device 50 may be configured to limit the current passing through it in its tripped state to, for example, approximately 85 mA and resistive element 52 may be, for example, approximately 470 Ohms.

As shown in FIG. 3, the cathode of diode 46 is coupled to input node 42 and the anode of diode 46 is coupled to node control 37' through PTC device 50 coupled in series with resistive element 52. The anode of diode 48 is coupled to ground at input node 44 and the cathode of diode 48 is coupled to control node 37'. The anode of LED 26 is coupled to a 12 Vdc signal and its cathode is coupled to control node 37'. When dry contact is externally made between input nodes 42 and 44, an electrical path is created between the 12 Vdc signal and ground through LED 26, resistive element 52, PTC device 50 and diode 46. Thus, for example, approximately 20 mA of current may flow through LED 26, turning on phototransistor 28 and clamping resistive element 22 to ground at output node 30. The ground at output node 30 is output as signal Alarm_in to indicate that the short-circuit event has occurred. Conversely, when input nodes 42 and 44 have not been short-circuited, there is no electrical path from the 12 Vdc signal to ground, current cannot flow through LED 26, phototransistor 28 is not turned on and output node 30 remains at 5 Vdc.

As discussed above, input node 42 may inadvertently be presented with a fault condition, such as, for example, a 120 Vac signal. Diode 46 is configured to block up to approximately 200 Volts peak. Thus, during the positive half cycle of the 120 Vac signal, the overvoltage will be blocked at input node 42 and current will not flow through diodes 46, 48. Thus, LED 26 will not conduct current, phototransistor 28 will not turn on and output node 30 will remain at 5 Vdc.

However, during the negative cycle of the 120 Vac signal, diode 46 will conduct approximately 250 mA peak of current, limited only by resistive element 52 and PTC device 50. This current is sufficient to overheat and trip PTC device 50. PTC device 50, in its tripped state, limits the current to a safe level of, for example, approximately 85 mA, protecting monitor circuit 36' from damage. Further, diode 48 protects LED 26 by clamping its cathode to ground. With control node 37' clamped to ground via diode 48, LED 26 will emit light, turning on phototransistor 28 and clamping output node 30 to ground. Thus, during the negative half cycle of the 120 Vac signal, the Alarm_in signal will be at ground potential, and during the positive half cycle of the 120 Vac signal, the Alarm_in signal will be at 5 Vdc. As a result, the output node 30 becomes a pulsed output signal. For this fault condition of an AC signal applied to the input node 42, FIG. 3 shows an AC signal 13 applied to the input node 42, and a resulting pulsed output signal 31 at the output node 30. The AC signal 13 and the output signal 31 are not necessarily applicable to other fault modes. Assuming that the 120 Vac signal oscillates at 60 Hz, the Alarm_in signal will alternate between 5 Vdc and ground approximately every 17 milliseconds. Thus, the alternating Alarm_in signal output by output node 30 provides an indication to external circuitry that a fault condition exists, allowing corrections to be made to any incorrect wiring or other faulty conditions without damage being caused to monitor circuit 36' or any external circuitry (not shown) coupled to output node 30.

In addition to the advantages described above, another advantage of monitor circuit 36' over the exemplary monitor circuit 10 of FIG. 1 includes the ability of monitor circuit 36' to continue functioning to provide indication of a trigger event even if input node 42 is mistakenly coupled to a 120 Vac signal rather than input node 44 during the trigger event. This feature may be essential in the situation, for example, where monitor circuit 36' is included in an alarm system to detect, for example, the presence of a fire.

In contradistinction, if exemplary monitor circuit 10 (FIG. 1) were subjected to such a fault condition, portions of exemplary monitor circuit 10 may be destroyed, leaving a 5 Vdc signal at output node 30 and providing no indication that a triggering event (in this example a fire detected by an external fire sensing device) has occurred, thereby leaving the alarm system unable to fulfill its intended use of protecting life, health and property.

Figure 4:
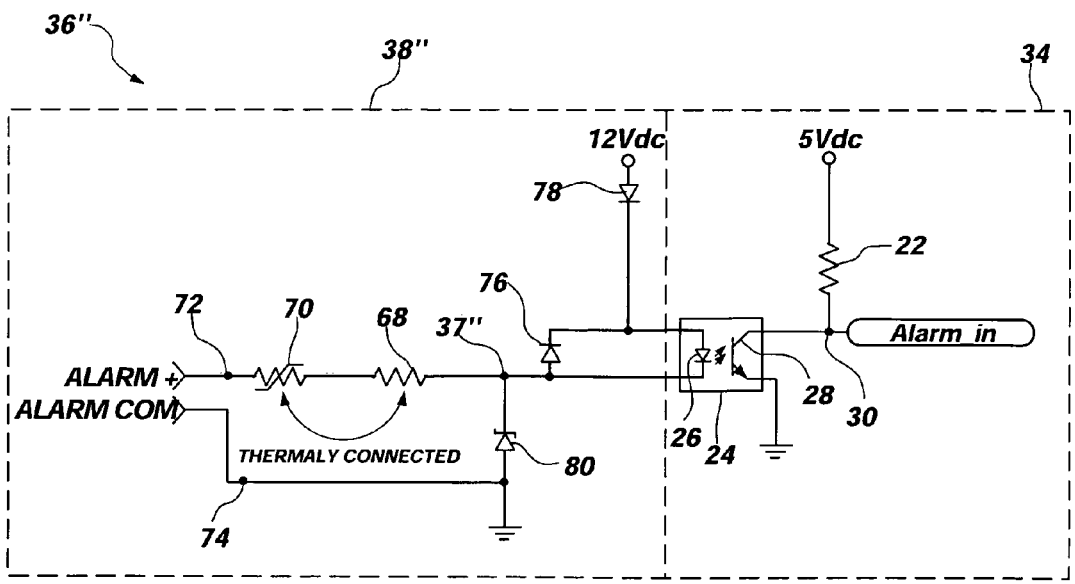
FIG. 4 is a schematic diagram according to the present invention of the isolated output section of FIG. 1 coupled to an input protection circuit comprising a PTC device thermally coupled to a resistive element and a breakdown diode to control the voltage at a control node.

Referring now to FIG. 4, a schematic diagram of a monitor circuit 36" is shown according to another embodiment of the present invention. Monitor circuit 36" comprises input protection circuit 38" coupled to the isolated output section 34 of FIG. 1. Input protection circuit 38" comprises input nodes 72, 74, diodes 76, 78, resistive element 68, PTC device 70 and breakdown diode 80. As used herein, breakdown diode 80 is also known as Zener diode 80. For illustrative purposes in explaining the operation of the input protection circuit 38", PTC device 70 may be configured to limit the current passing through it in its tripped state to approximately 85 mA, resistive element 68 may be approximately 470 Ohms and Zener diode 80 may have a Zener voltage of approximately 17.1 Vdc, although other characteristic values may be applied depending on specific application of the monitor circuit 36" as will be appreciated by those of ordinary skill in the art.

As shown in FIG. 4, PTC device 70 and resistive element 68 are coupled in series between input node 72 and control node 37". PTC device 70 and resistive element 68 are also in thermal contact with one another. By thermally connecting PTC device 70 and resistive element 68, the trip time of PTC device 70 can be vastly improved because the heat generated by current passing through resistive element 68 will assist in heating PTC device 70. The anode of Zener diode 80 is coupled to ground at input node 74 and its cathode is coupled to the anode of diode 76 and the cathode of LED 26 at control node 37". The cathodes of diodes 76 and 78 are each coupled to the anode of LED 26. The anode of diode 78 is coupled to a 12 Vdc signal. When dry contact is externally made between input nodes 72 and 74, an electrical path is created between the 12 Vdc signal and ground through diode 78, LED 26, resistive element 68 and PTC device 70. The current flowing through LED 26 turns on phototransistor 28, clamping resistive element 22 to ground at output node 30. The ground at output node 30 is output as signal Alarm_in to indicate that the dry contact between input nodes 72 and 74 has been made. Conversely, when input nodes 72 and 74 have not been short-circuited, there is no electrical path from the 12 Vdc signal to ground, LED 26 does not emit light, phototransistor 28 does not turn on and output node 30 remains at 5 Vdc.

Diodes 76, 78 provide protection to monitor circuit 36" as well as external circuitry. Diode 76 protects LED 26 from any negative voltage spike that may occur at control node 37". Diode 78 prevents current from being drawn from external circuitry coupled to input node 72 in the event that the power source providing the 12 Vdc signal fails.

As discussed above, input node 72 may inadvertently be presented with a fault condition, such as a 120 Vac signal. During the positive half cycle of the 120 Vac signal, Zener diode 80 will operate in its breakdown region to clamp control node 37" at approximately 17 Vdc (based on the exemplary characteristic values set forth above). With control node 37" clamped at approximately 17 Vdc, LED 26 will not emit light, phototransistor 28 will not turn on and output node 30 will remain at 5 Vdc.

During the negative half cycle of the 120 Vac signal, Zener diode 80 is no longer operating in the breakdown region and effectively clamps control node 37" to ground, thus protecting LED 26. The current flowing through resistive element 68 and PCT device 70 will generate enough heat to trip PCT device 70, limiting its current to approximately 85 mA to protect monitor circuit 36" from damage. With control node 37" clamped to ground, LED 26 will emit light, turning on phototransistor 28 and clamping output node 30 to ground. Thus, during the negative half cycle of the 120 Vac signal, the Alarm_in signal will be at ground potential, and during the positive half cycle, the Alarm_in signal will be at 5 Vdc. Assuming that the 120 Vac signal oscillates at 60 Hz, the Alarm_in signal will alternate between 5 Vdc and ground approximately every 17 milliseconds. Thus, the alternating Alarm_in signal output by output node 30 provides an indication that a fault condition exists, allowing corrections to be made to any incorrect wiring or other faulty conditions without damage being caused to monitor circuit 36" or any external circuitry (not shown) attached to output node 30.

Monitor circuit 36" generally includes all of the advantages described above of monitor circuit 36' of FIG. 3. In addition, monitor circuit 36" eliminates the need for a large and expensive diode coupled to input node 42. In some applications, diode 46 of monitor circuit 36' (FIG. 3) may be required to meet stringent static discharge requirements such as, for example, 20 positive and 20 negative pulses of 100 to 2,400 Vdc at approximately 1.2 Joules. Thus, to conform with such requirements, diode 46 may be relatively large and expensive. As the above-described operation of monitor circuit 36" indicates, a diode coupled to input node 72 of FIG. 4 is not required, thereby eliminating such an issue.

Figure 5:
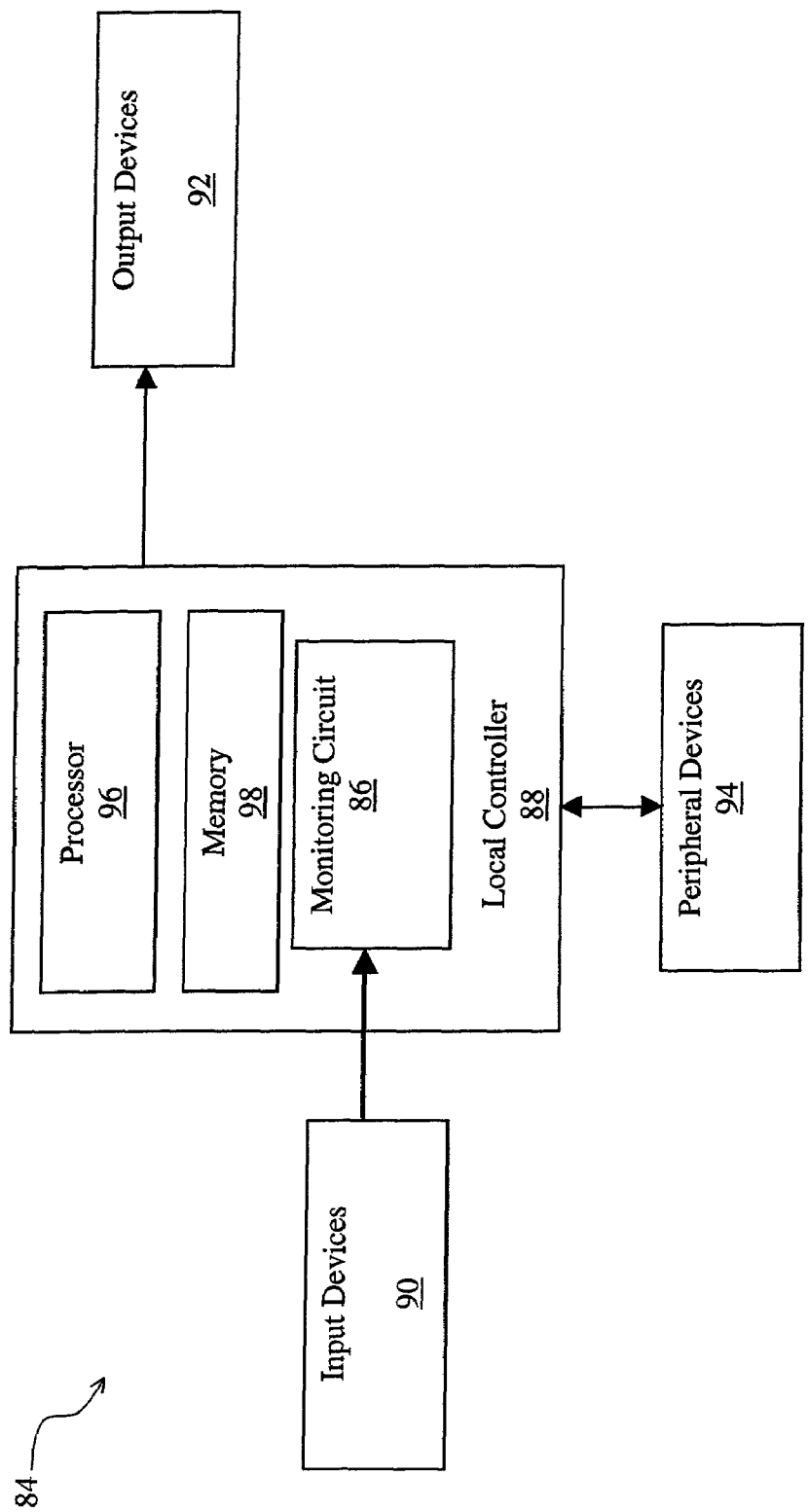
FIG. 5 is a block diagram of an alarm system using a local controller with an improved monitor circuit according to the present invention.

Referring now to FIG. 5, a block diagram is shown of an alarm system 84 employing a monitor circuit 86 according to the present invention. Alarm system 84 comprises a local controller 88, input devices 90, output devices 92 and peripheral devices 94. Local controller 88 comprises monitor circuit 86 coupled to input devices 90. Monitor circuit 86 may comprise any one of the embodiments 36, 36' or 36" described above in connection with FIGS. 2 through 4. Local controller 88 may also include a processor 96 and a memory device 98 processing and storing parameters associated with predetermined operations of the alarm system 84.

Input devices 90 may include, by way of example only, sensors, switches, dry contact switches, monitoring stations or additional controllers. More specific examples of such inputs may include, for example: a sensor for detecting heat, a sensor for detecting smoke, a sensor for detecting the open/closed status of a door or other structure; a sensor for detecting when an obstruction is in the path of a door or other structure while the door/structure is closing; and devices associated with security access (e.g., keypad entry, card readers, biometric devices, etc.).

Output devices 92 may include, by way of example only, actuators, switches, indicators, monitoring stations or additional controllers. More specific examples of such outputs may include, for example: a switch or actuator used to stop a door or other structure from closing, or to open the door/structure for a predetermined time period when already closed; an actuator causing a latch to lock a door in a closed position; a switch or actuator associated with security access (e.g., keyed entry or card readers); or indicators such as a horn or an LED display indicating the current status of a door/structure or of the alarm system 84.

Peripheral devices 94 may include additional input or output devices such as, for example, those used in configuring, controlling or otherwise interacting with the local controller 88 and may further include such input devices 90 and output devices 92 described above.

While the present invention has been disclosed in terms of an exemplary embodiment and variations thereof, those of ordinary skill in the art will recognize and appreciate that the invention is not so limited. Those of ordinary skill in the art will recognize and appreciate that many additions, deletions and modifications to the disclosed embodiment and its variations may be implemented without departing from the scope of the invention, which is limited only by the appended claims and their legal equivalents.

What is claimed is:

1. A monitor circuit comprising:
   an input protection circuit, comprising:
      a first signal input;
      a second signal input coupled to ground;
      a fault interrupt device comprising a fusible element coupled between the first signal input and a control node; and
      a diode operably coupled between the second signal input and the control node; and
   an isolated output circuit comprising an optically coupled isolator operably coupled to the control node and configured to assert an output signal upon an occurrence of a triggering event at the first signal input;
   wherein the fault interrupt device is configured to protect the optically coupled isolator from a fault condition on the first signal input and wherein the monitor circuit is further configured to also produce the output signal, while in the fault condition, upon the occurrence of the triggering event at the first signal input.

2. The monitor circuit of claim 1, wherein the fault interrupt device is further configured to limit a current at the control node to a predefined level.

3. The monitor circuit of claim 1, wherein the fault interrupt device is further configured to limit a voltage at the control node to a predefined level.

4. The monitor circuit of claim 1, wherein the fusible element comprises a positive temperature coefficient ("PTC") device configured to limit a current passing therethrough to a predetermined current limit upon reaching a defined temperature.

5. The monitor circuit of claim 4, wherein the input protection circuit further comprises another diode and a resistive element coupled in series with the PTC device between the first signal input and the control node, the another diode configured to isolate the PTC device from a positive voltage on the first signal input.

6. The monitor circuit of claim 5, wherein the diode is configured to limit a voltage at the control node to a predetermined voltage when a negative voltage is applied to the first signal input.

7. The monitor circuit of claim 6, wherein the monitor circuit is configured to generate an asserted voltage on the output signal in response to the fault condition, and wherein the fault condition comprises a short between the first signal input and the second signal input.

8. The monitor circuit of claim 6, wherein the monitor circuit is configured to generate a periodic waveform on the output signal in response to a presence of the fault condition, and wherein the fault condition comprises a periodic signal on the first signal input.

9. The monitor circuit of claim 8, wherein the periodic waveform comprises a pulsed waveform.

10. The monitor circuit of claim 4, wherein the diode comprises a breakdown diode, the breakdown diode being configured:
   to limit a voltage at the control node to a first predetermined voltage level when a positive voltage is applied to the first signal input; and
   to limit a voltage at the control node to a second predetermined voltage level when a negative voltage is applied to the first signal input.

11. The monitor circuit of claim 10, wherein the fault interrupt device further comprises a resistive element coupled in series with the PTC device, wherein the resistive element is also thermally coupled to the PTC device.

12. The monitor circuit of claim 10, wherein the monitor circuit is configured to generate an asserted voltage on the output signal in response to the fault condition, and wherein the fault condition comprises a short between the first signal input and the second signal input.

13. The monitor circuit of claim 10, wherein the monitor circuit is configured to generate a periodic waveform on the output signal in response to a presence of the fault condition, and wherein the fault condition comprises a periodic signal on the first signal input.

14. The monitor circuit of claim 13, wherein the periodic waveform comprises a pulsed waveform.

15. The monitor circuit of claim 1, wherein the triggering event includes completion of an external dry connection between the first signal input and the second signal input.

16. The monitor circuit of claim 1, wherein the triggering event is in response to detection of a fire.

17. An alarm system comprising a controller, the controller comprising:
   a processor;
   a memory device; and a monitor circuit comprising:
an input protection circuit, comprising:
a first signal input;
a second signal input coupled to ground;
a fault interrupt device comprising a fusible element coupled between the first signal input and a control node; and
a diode operably coupled between the second signal input and the control node; and
an isolated output circuit comprising an optically coupled isolator operably coupled to the control node and configured to assert an output signal upon an occurrence of a triggering event at the first signal input;
wherein the fault interrupt device is configured to protect the optically coupled isolator from a fault condition on the first signal input and wherein the monitor circuit is further configured to also produce the output signal, while in the fault condition, upon the occurrence of the triggering event at the first signal input.

18. The alarm system of claim 17, wherein the fusible element comprises a positive temperature coefficient ("PTC") device configured to limit a current passing through it to a predetermined limit upon reaching a defined temperature.

19. The alarm system of claim 18, wherein the input protection circuit further comprises another diode and a resistive element coupled in series with the PTC device between the first signal input and the control node, the another diode configured to isolate the PTC device from a positive voltage on the first signal input.

20. The alarm system of claim 19, wherein the diode is configured to limit a voltage at the control node to a predetermined voltage when a negative voltage is applied to the first signal input.

21. The alarm system of claim 20, wherein the alarm system is configured to generate an asserted voltage on the output signal in response to the fault condition, and wherein the fault condition comprises a short between the first signal input and the second signal input.

22. The alarm system of claim 20, wherein the alarm system is configured to generate a periodic waveform on the output signal in response to a presence of the fault condition, and wherein the fault condition comprises a periodic signal on the first signal input.

23. The alarm system of claim 22, wherein the periodic waveform comprises a pulsed waveform.

24. The alarm system of claim 19, wherein the diode comprises a breakdown diode, the breakdown diode configured to limit a voltage at the control node to a first predetermined voltage level when a positive voltage is applied to the first signal input and to limit a voltage at the control node to a second predetermined voltage level when a negative voltage is applied to the first signal input.

25. The alarm system of claim 24, wherein the fault interrupt device further comprises a resistive element coupled in series with the PTC device, wherein the resistive element is also thermally coupled to the PTC device.

26. The alarm system of claim 24, wherein the alarm system is configured to generate an asserted voltage on the output signal in response to the fault condition, and wherein the fault condition comprises a short between the first signal input and the second signal input.

27. The alarm system of claim 24, wherein the alarm system is configured to generate a periodic waveform on the output signal in response to a presence of the fault condition, and wherein the fault condition comprises a periodic signal on the first signal input.

28. The alarm system of claim 27, wherein the periodic waveform comprises a pulsed waveform.

29. The alarm system of claim 17, wherein the triggering event is in response to detection of a fire.

30. A method of fault protecting a monitor circuit having a first signal input operably coupled to an input protection circuit and a control node operably coupling the input protection circuit to an isolated output circuit, the method comprising:
applying a fault condition to the first signal input, the fault condition comprising a periodic signal including a positive half cycle and a negative half cycle;
blocking a positive voltage from the control node during the positive half cycle;
setting a voltage at the control node to a predetermined voltage level during the negative half cycle;
limiting a current between the first signal input and the control node during the negative half cycle to a predetermined current level with a fusible element; and
generating an output signal from the isolated output circuit, the output signal being isolated from and responsive to the control node.

31. The method of claim 30, wherein blocking the positive voltage further comprises blocking the positive voltage with another diode in a reverse biased condition during the positive half cycle.

32. The method of claim 30, wherein limiting the current further comprises tripping a positive temperature coefficient (new) device configured as the fusible element.

33. The method according to claim 30, wherein setting the voltage at the control node further comprises passing a ground potential from a second signal input of the input protection circuit to the control node through a diode configured in a forward biased condition during the negative half cycle.

34. The method of claim 30, wherein generating the output signal further comprises setting the output signal to a first voltage level during the positive half cycle and setting the output signal to a second voltage level during the negative half cycle.

35. A method of fault protecting a monitor circuit having a first signal input operably coupled to an input protection circuit and a control node operably coupling the input protection circuit to an isolated output circuit, the method comprising:
applying a fault condition to the first signal input, the fault condition comprising a periodic signal including a positive half cycle and a negative half cycle;
setting a voltage at the control node to a first predetermined voltage level during the positive half cycle;
setting the voltage at the control node to a second predetermined voltage level during the negative half cycle;
limiting a current between the first signal input and the control node to a predetermined current level with a fusible element; and
generating an output signal from the isolated output circuit, the output signal being isolated from and responsive to the control node.

36. The method of claim 35, wherein setting the voltage at the control node to the first predetermined voltage level comprises operating a breakdown diode coupled between the control node and a second signal input of the input protection circuit in a breakdown region during the positive half cycle.

37. The method of claim 36, wherein setting the voltage at the control node to the second predetermined voltage level further comprises passing a ground potential from the second signal input through the breakdown diode in a forward biased condition during the negative half cycle.

38. The method of claim 35, wherein limiting the current further comprises tripping a positive temperature coefficient ("PTC") device configured as the fusible element.

39. The method of claim 38, wherein tripping the PTC device further comprises transferring thermal energy to the PTC device from a resistive element coupled between the PTC device and a ground potential.

40. The method of claim 35, wherein generating the output signal further comprises setting the output signal to a first voltage level during the positive half cycle and setting the output signal to a second voltage level during the negative half cycle.

* * * * *

UNITED STATES PATENT AND TRADEMARK OFFICE
CERTIFICATE OF CORRECTION

PATENT NO. : 7,050,283 B2
APPLICATION NO. : 10/134338
DATED : May 23, 2006
INVENTOR(S) : D. George Field, Kevin D. Banta and E. Carl Goodman It is certified that error appears in the above-identified patent and that said Letters Patent is hereby corrected as shown below:

The title page should be deleted and substitute therefore the attached title page.

In the drawings:
    On FIG. 3, change "31" to --100-- as shown on the attached page.

| | | |
|---|---|---|
| COLUMN 4, | LINES 38-39, | change "node control" to --control node-- |
| COLUMN 5, | LINE 15, | change "31" to --100-- |
| COLUMN 5, | LINE 16, | change "31" to --100-- |

CLAIM 19, COLUMN 9, LINE 29,    change "clement" to --element--

(12) United States Patent
Field et al.

(10) Patent No.: US 7,050,283 B2
(45) Date of Patent: May 23, 2006

(54) METHOD AND APPARATUS FOR PROTECTING MONITOR CIRCUIT FROM FAULT CONDITION

(75) Inventors: D. George Field, Pleasant Grove, UT (US); Kevin D. Banta, Highland, UT (US); E. Carl Goodman, Bountiful, UT (US)

(73) Assignee: Won-Door Corporation, Salt Lake City, UT (US)

( * ) Notice: Subject to any disclaimer, the term of this patent is extended or adjusted under 35 U.S.C. 154(b) by 151 days.

(21) Appl. No.: 10/134,338

(22) Filed: Apr. 29, 2002

(65) Prior Publication Data

US 2003/0202310 A1 Oct. 30, 2003

(51) Int. Cl.
*H02H 5/04* (2006.01)

(52) U.S. Cl. .................................. 361/106; 361/103
(58) Field of Classification Search .............. 361/106, 361/104, 103
See application file for complete search history.

(56) References Cited

U.S. PATENT DOCUMENTS

| | | | |
|---|---|---|---|
| 4,546,305 A * | 10/1985 | Goddijn et al. ............. 323/299 |
| H248 H * | 4/1987 | Middlebrooks ............. 340/639 |
| 4,700,130 A | 10/1987 | Bloemen |
| 4,967,176 A | 10/1990 | Horsma et al. |
| 5,072,327 A * | 12/1991 | Knollman et al. ......... 361/106 |
| 5,245,879 A | 9/1993 | McKeon |
| 5,612,847 A | 3/1997 | Malecke et al. |
| 5,745,322 A | 4/1998 | Duffy et al. |
| 5,864,280 A | 1/1999 | Hall |
| 5,976,720 A | 11/1999 | St. Jean et al. |
| 6,307,758 B1 * | 10/2001 | Geren ......................... 363/21.15 |
| 6,331,763 B1 * | 12/2001 | Thomas et al. ............. 320/136 |
| 6,518,731 B1 * | 2/2003 | Thomas et al. ............. 320/136 |

FOREIGN PATENT DOCUMENTS

| | | |
|---|---|---|
| DE | 229 261 A1 | 10/1985 |
| DE | 298 08 365 U1 | 9/1998 |
| JP | 10-023660 * | 1/1998 |
| WO | WO 99/40663 * | 8/1999 |

OTHER PUBLICATIONS

Secutron Fire Alarm Systems: "Modul R" MR-2605, 5 Zone Conventional Fire Alarm Control Unit, Release 1.1, Canada XP002248087, www.secutron.ca, Oct. 18, 2000.
PCT International Search Report dated Jul. 17, 2003.

* cited by examiner

*Primary Examiner*—Brian Sircus
*Assistant Examiner*—Zeev Kitov
(74) *Attorney, Agent, or Firm*—TraskBritt

(57) ABSTRACT

A method and apparatus for improving the fault protection of a monitor circuit is provided by coupling an input protection circuit to an output section. The input protection circuit may include a fusible device that limits or removes a fault condition present at an input to the input protection circuit. The fusible device may be, for example, a resettable positive temperature coefficient ("PTC") device configured to limit the current passing through it to a predetermined level once it reaches a predetermined temperature. A resistive element may be thermally coupled to the PTC device to assist in reaching the predetermined temperature. The monitor circuit may further be configured to generate a sensory signal in response to a fault condition.

40 Claims, 4 Drawing Sheets

UNITED STATES PATENT AND TRADEMARK OFFICE
CERTIFICATE OF CORRECTION

PATENT NO. : 7,050,283 B2
APPLICATION NO. : 10/134338
DATED : May 23, 2006
INVENTOR(S) : D. George Field, Kevin D. Banta and E. Carl Goodman It is certified that error appears in the above-identified patent and that said Letters Patent is hereby corrected as shown below:

Replace FIG. 1 with the following:

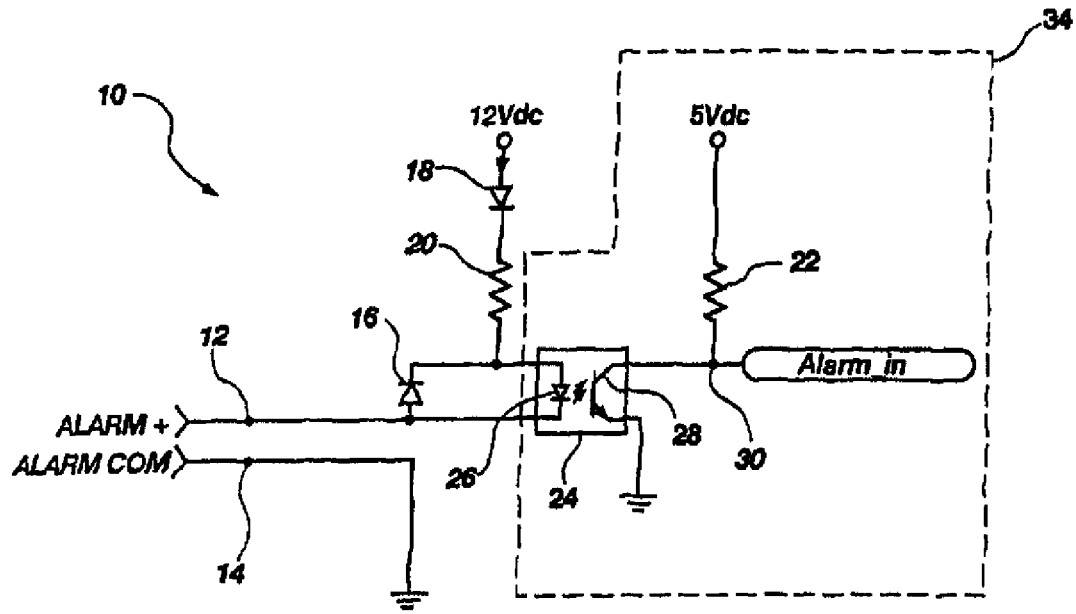

(PRIOR ART)
Fig. 1

UNITED STATES PATENT AND TRADEMARK OFFICE
CERTIFICATE OF CORRECTION

PATENT NO.        : 7,050,283 B2
APPLICATION NO.   : 10/134338
DATED             : May 23, 2006
INVENTOR(S)       : D. George Field, Kevin D. Banta and E. Carl Goodman It is certified that error appears in the above-identified patent and that said Letters Patent is hereby corrected as shown below:

Replace FIG. 3 with the following:

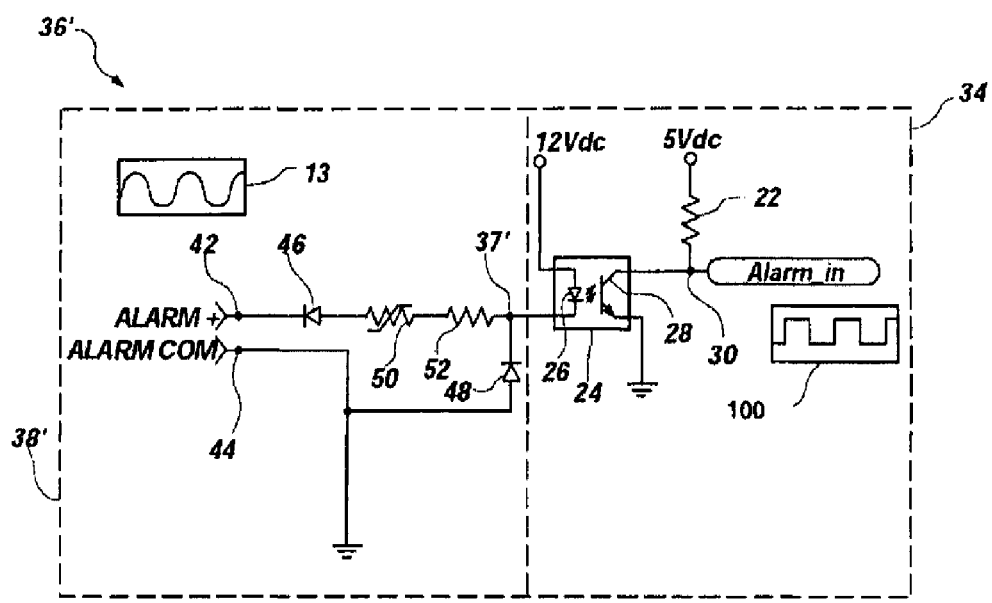

Fig. 3

Signed and Sealed this

Fourteenth Day of April, 2009

JOHN DOLL
*Acting Director of the United States Patent and Trademark Office*